May 16, 1939.    J. W. BUTLER    2,158,926
ELECTRIC CIRCUIT
Filed Aug. 10, 1937
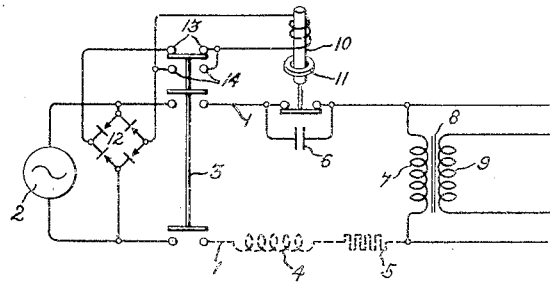
Inventor
John W. Butler,
by Harry E. Dunham
His Attorney Patented May 16, 1939

2,158,926

UNITED STATES PATENT OFFICE 2,158,926

ELECTRIC CIRCUIT

John W. Butler, Schenectady, N. Y., assignor to General Electric Company, a corporation of New York Application August 10, 1937, Serial No. 158,345

8 Claims. (Cl. 171—97)

My invention relates to electric circuits and more particularly to protective arrangements for alternating current power distribution and transmission circuits which contain series capacitors.

In an application of Roy C. Buell, Serial No. 158,344, filed August 10, 1937, (now Patent No. 2,120,855, granted June 14, 1938) and assigned to the assignee of the present application there is disclosed and broadly claimed an invention for eliminating abnormal currents in alternating current power transmission and distribution circuits which contain series capacitors. Series capacitors are inserted in alternating current power distribution and transmission circuits for neutralizing the distributed inductance of these circuits. This results in improved voltage regulation of such circuits and in increased power limits of systems which are interconnected by means of such circuits.

It has been found, when such circuits are relatively lightly loaded and they are connected to a source of alternating current supply, that at certain times abnormal frequency and magnitude currents occur therein. These currents are believed to be caused by an initial charge which is put on the series capacitor as a result of the abnormally high magnetizing current taken by one or more distribution transformers whose cores saturate during the first half cycle of applied voltage. It has been noted that these objectionable currents occur most frequently when the switching is done at or near the zero point of the supply voltage wave.

In accordance with my invention, I provide a novel and simple automatic arrangement for eliminating the occurrence of these abnormal currents.

An object of my invention is to provide a new and improved electric circuit.

Another object of my invention is to provide a new and improved arrangement for automatically eliminating the occurrence of abnormal distribution transformer magnetizing currents in alternating current power distribution and transmission circuits which contain series capacitors.

My invention will be better understood from the following description taken in connection with the accompanying drawing and its scope will be pointed out in the appended claims.

Referring now to the single figure of the accompanying drawing, which diagrammatically illustrates an embodiment of my invention, I have shown therein an alternating current power transmission or distribution circuit 1 which is adapted to be connected to a conventional standard frequency source of alternating current 2 by means of a suitable switch or circuit maker or breaker 3. Circuit 1 contains a certain amount of series distributed self-inductance which is shown lumped by the dotted coil 4. Similarly this circuit also includes resistance which in reality is distributed but which is shown for convenience as being lumped by the dotted resistor 5. A series capacitor 6 is connected in the circuit and is designed to have sufficient capacitance so as to neutralize partially or completely the inductance 4 or even to over-neutralize this inductance sufficiently to correct for the voltage drop in the resistance 5 at some one particular power factor of the circuit. Connected across the circuit 1 is a distribution transformer 7 having an iron core 8 which normally is operated slightly below the knee of its saturation curve as is conventional practice with most alternating current electromagnetic machinery. A secondary winding 9 on the transformer leads to any suitable load or load circuit.

As has been previously explained, when such a circuit is connected to an alternating voltage, as for example by the closing of the switch 3, at a time when the voltage is at or near the zero point of its wave abnormal frequency currents are produced in the circuit and these currents are highly objectionable as they produce distorted transformer secondary voltages and also produce relatively high losses.

In order to prevent the occurrence of this abnormal phenomenon, I provide interlocking connections between the main circuit breaker 3 and an auxiliary contactor or circuit breaker 10 for short-circuiting the capacitor 6. If desired this capacitor short-circuiting device may be part of the conventional overload and dielectric failure protective equipment with which series capacitors are ordinarily provided. It is provided with means for giving it a time relay drop-out which is shown in the drawing as a short-circuited turn 11 but which in practice usually consists of a copper jacket on part of the core.

Contactor 10 may be supplied with current by any suitable means and if a separate source of control current is not available, such current may be obtained by a rectifier, shown at 12, connected across the alternating current supply source 2. The operating winding of the short-circuiting contactor 10 is connected across the output of the rectifier 12 through a set of auxiliary contacts 13 on the main switch 3. These auxiliary contacts are closed when the main switch is opened and are arranged to open when the main switch closes. A second set of auxiliary contacts 14 on the main switch, which are open when the main switch is opened and which close when the main switch closes, are connected to short-circuit the operating winding of contactor 10.

The operation of the illustrated embodiment of my invention is as follows: With the parts in the positions shown in the drawing and assuming that the source of alternating current 2 is operative, the contactor 10 will be energized through the auxiliary contacts 13 and the rectifier 12 and will maintain a short circuit about the series capacitor 6. When the switch 3 is closed the opening of the contact 13 will deenergize the short-circuiting contactor 10 but by reason of the short-circuited turn 11 thereon combined with the short-circuiting of the relay 10 by means of the contacts 14 immediately after the opening of the contacts 13, the flux in the contactor 10 is maintained an appreciable time thereby maintaining the contactor closed. Therefore, even if the main switch 3 is closed exactly at the zero point of the voltage wave of the source 2, the momentary relatively high magnetizing current which will tend to flow in the circuit as the result of saturation of the core 8 of the distribution transformer 7 by the initial relatively high value of transient flux produced during the first half cycle of supply voltage will not flow through the capacitor 6 and consequently will not build up a charge thereon. In a few cycles the transformer magnetizing current and flux will settle down to their normal steady state values in which the magnetizing current will lag the supply voltage by 90 electrical degrees and in which the transformer core flux will be symmetrical about the zero voltage axis and will have maximum positive and negative values which will not produce saturation of the core. This adjustment of the circuit to its steady state value will occur in a relatively few cycles and in fact will occur in such a short time that circuit conditions will be substantially normal by the time the delayed drop-out effect of the contactor 10 has ceased to be active and this contactor drops out. As soon as the contactor 10 drops out the series capacitor 6 will be inserted in the circuit and the circuit will operate in its normal and intended manner.

By means of my simple interlocking control between the main circuit breaker and the capacitor short-circuiting contactor extremely economical and reliable control is secured in which there are no continuous losses when the circuit is in normal operation, which does not depend upon frequency response, which is an important feature as the frequency of abnormal magnetizing currents is not constant.

While I have shown and described a particular embodiment of my invention, it will be obvious to those skilled in the art that changes and modifications can be made therein without departing from my invention and I therefore aim in the appended claims to cover all such changes and modifications as fall within the true spirit and scope of my invention.

What I claim as new and desire to secure by Letters Patent of the United States, is:

1. In combination, a source of alternating current, an electric circuit, a switch for completing a circuit from said source through said circuit, an inductive device with a magnetically saturable core having its exciting winding connected in said circuit, a capacitor connected in series in said circuit, protective means for preventing the establishment of abnormal exciting currents for said inductive device in said circuit as the result of the interrelation of the effect of magnetic saturation of the core of said inductive device with said capacitor if said switch is closed at or near the zero point of the voltage wave of said source, and interlocking connections for controlling said protective means by the operation of said switch.

2. In combination, a source of alternating current, an electric circuit, a switch for completing a circuit from said source to said circuit, an inductive device with a magnetically saturable core having its exciting winding connected across said circuit, an appreciable amount of linear series induction in said circuit, a capacitor connected in series in said circuit for substantially neutralizing said linear series inductance, means for effectively opening and closing a relatively low impedance shunt connected path around said capacitor, interlocking connections between said switch and said means for causing said means to close said path before said switch closes and opens said path after said switch closes in order to prevent the establishment of abnormal exciting current for said inductive device in said circuit as a result of the interaction of the effect of magnetic saturation of the core of said inductive device with said capacitor if said switch is closed at or near the zero point of the voltage wave of said source.

3. In combination, a source of alternating current, an electric circuit, a switch for completing a circuit from said source through said circuit, an inductive device with a magnetically saturable core having its exciting winding connected across said circuit, an appreciable amount of linear series inductance in said circuit, a capacitor connected in series with said circuit for substantially neutralizing said linear series inductance, a time delay drop-out opening relay for effectively opening and closing a relatively low impedance conducting path around said capacitor, and interlocking means between said switch and said relay for energizing said relay when said switch is opened and deenergizing said relay when said switch is closed in order to prevent the establishment of abnormal exciting current for said inductive device in said circuit as a result of the interaction of the effect of magnetic saturation of the core of said inductive device with said capacitor if said switch is closed at or near the zero point of the voltage wave of said source.

4. In combination, a standard commercial frequency alternating current power station, a power distribution circuit, a switch for connecting said circuit to said source, a distribution transformer connected in said circuit, a series capacitor connected in said circuit for neutralizing at least a portion of the series distributed inductance of said circuit, a contactor for short-circuiting said capacitor, and interlocking connections for controlling the closing and opening of said contactor by the opening and closing of said switch.

5. In combination, a standard commercial frequency alternating current power station, a power distribution circuit, a switch for connecting said circuit to said source, a distribution transformer connected in said circuit, a series capacitor connected in said circuit for neutralizing at least a portion of the inductance of said circuit, a time delay opening contactor for short-circuiting said capacitor, and interlocking connections for controlling the closing and opening of said contactor by the opening and closing of said switch.

6. In combination, a standard commercial frequency alternating current power station, a power distribution circuit, a switch for connecting said circuit to said source, a distribution transformer connected across said circuit, a series capacitor connected in said circuit for neutralizing at least a portion of the inductance of said circuit, a time delay contactor for short-circuiting said capacitor, a rectifier connected across said circuit for energizing said contactor, and interlocking connections for controlling the closing and opening of said contactor by the opening and closing of said switch.

7. In combination, a standard commercial frequency alternating current power station, a power distribution circuit, a switch for connecting said circuit to said source, a distribution transformer connected across said circuit, a series capacitor connected in said circuit for neutralizing at least a portion of the inductance of said circuit, a time delay contactor for short circuiting said capacitor, and interlocking connections for controlling the closing and opening of said contactor by the opening and closing of said switch, said connections including connections for energizing said contactor from across said circuit.

8. In combination, a standard commercial frequency alternating current power station, a power distribution circuit, a switch for connecting said circuit to said source, a distribution transformer connected across said circuit, a series capacitor connected in said circuit for neutralizing at least a portion of the inductance of said circuit, a time delay opening contactor short-circuiting said capacitor, said contactor being energized through a rectifier from across said source, and interlocking connections controlling the closing and time delayed opening of said contactor by the opening and closing respectively of said switch.

JOHN W. BUTLER.